Nov. 25, 1969          C. K. STEDMAN          3,479,739
METHOD OF MAKING A TRANSDUCER BEAM
Filed April 24, 1967
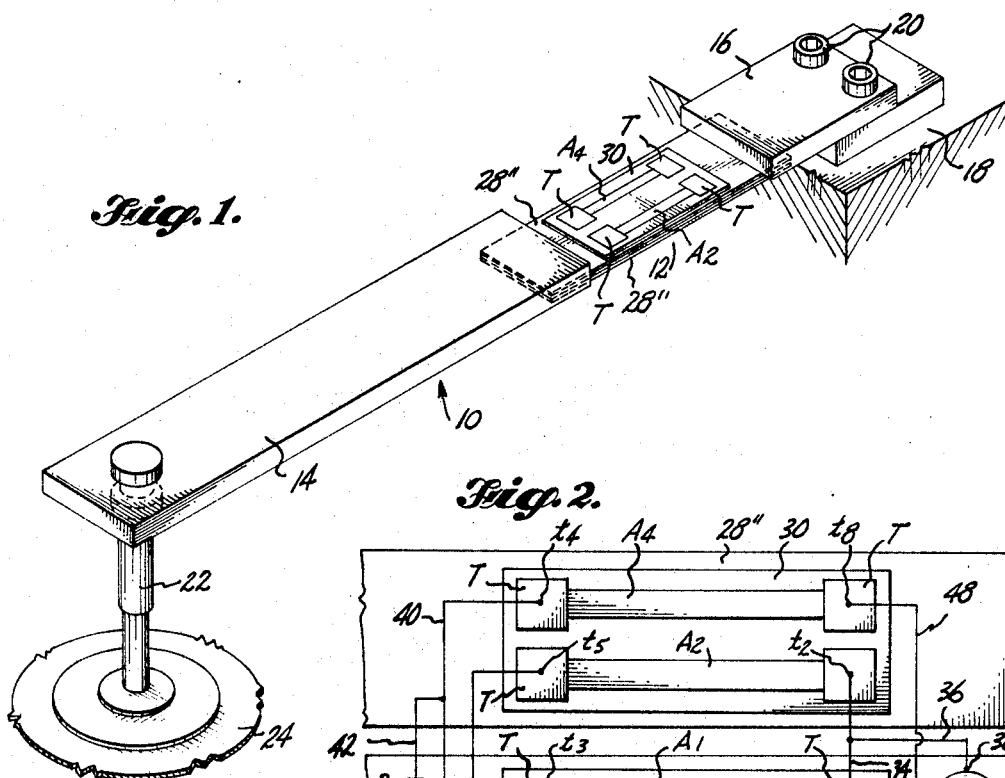
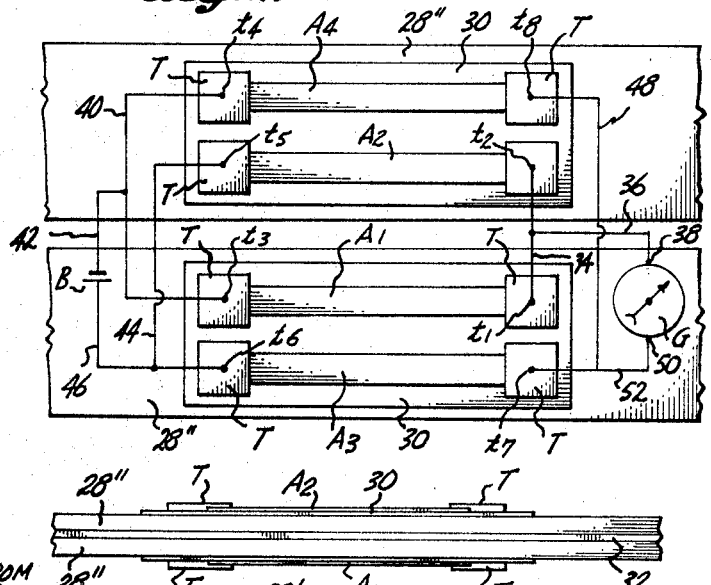
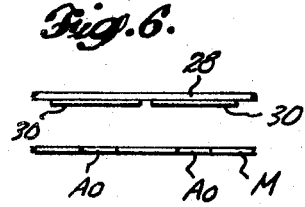
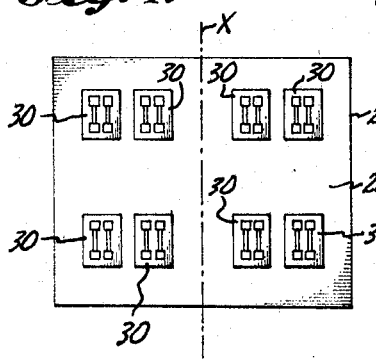
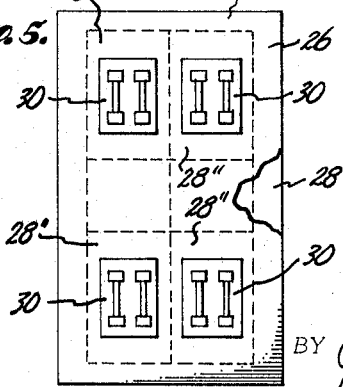
INVENTOR.
CECIL K. STEDMAN
BY
Graybeal, Cole & Barnard
ATTORNEYS United States Patent Office 3,479,739
Patented Nov. 25, 1969

3,479,739
METHOD OF MAKING A TRANSDUCER BEAM
Cecil K. Stedman, Enumclaw, Wash., assignor to Statham Instrument, Inc., Los Angeles, Calif., a corporation of California
Filed Apr. 24, 1967, Ser. No. 633,116
Int. Cl. H04r 31/00
U.S. Cl. 29—620                    12 Claims

ABSTRACT OF THE DISCLOSURE

Transducer structure in the nature of a thin, laminated, flexural element having evaporated film strain gages on each of two opposite surfaces. Fabrication method involving simultaneously depositing by a single vapor source plural films of a strain sensitive electroconductive material onto insulative front surface areas of two separate or separable parts of a sheet material, to form two substantially identical bridge arm means, then bonding the two parts together, back-to-back.

BACKGROUND OF THE INVENTION

A common type of pressure transducer includes a diaphragm that is subjected to and displaced by changes in pressure of a body of fluid. The motion of the diaphragm is measured by means of an instrumented cantillver beam, the free end of which is mechanically connected to the diaphragm. Prior art beams of this type are composed of a flexural member, i.e. the beam itself, two strain gages of a type formed apart from the flexural member (e.g. wire or preformed foil), glued to the side thereof that is subjected to tensile strain when the beam is deflected, and two additional strain gages of the same type glued to the opposite side of the beam, which during the same deflecton experiences compressive strain. These four strain gages are electrically interconnected so as to form a Wheatstone bridge circuit in which strain induced resistance changes in all four arms contribute additively to the electrical output.

The glued on type of strain gages have been used because heretofore this was the only known way of providing both sides of the beam with strain gages or bridge arms which are sufficiently alike in their response to strain and temperature changes. A disadvantage of the glued or strain gages is that the organic glue that is used cannot withstand very high temperatures or prolonged exposure to nuclear radiation.

SUMMARY OF THE INVENTION

The present invention relates to instrumented beams or flexural elements of the above described type having well matched strain gages or bridge arms of the deposited film type on each of its opposite sides, whereby organic glue and the problems caused thereby are not involved. It also relates to the fabrication technique or method making it possible to employ deposited film strain gages on a flexure measuring element of this type.

Deposited film strain gages are sufficiently well matched in their response to strain and temperature changes only if they are deposited simultaneously. This is because it is practically impossible to sufficiently duplicate deposition conditions from one deposition operation to the next. The present invention provides a method by which an instrumented flexural element can be provided with deposited film strain gage means on both of two opposite sides, which gages were deposited simultaneously, in a single deposition step.

Basically, the fabrication method of the present invention comprises: using a single vapor source to simultaneously deposit plural, substantially identical films of a strain sensitive electroconductive material onto uniplanar, insulative front surface areas of two separate or separable parts of a beam element material, to form two substantially identical bridge arm means; then separating the two parts if not already separated; then bonding the two parts together, back-to-back, with care being taken to see that the bridge arm means on each part is in precise registration with the bridge arm means on the other part; and then trimming the bonded sandwich structure to size.

A preferred form of instrumented beam for pressure transducer use comprises a relatively thin and limber, instrumented intermediate portion, constructed according to the above described technique, which is rigidly interconnected between two thicker and stiffer end portions. One end of the composite beam so formed is fixed in cantilever fashion to a support, and the opposite end or free end is mechanically connected to a pressure responsive diaphragm.

These and other inherent objects, feature, advantages and characteristics of the present invention will be apparent from the following description of typical and therefore nonlimitive embodiments of the invention, as described below in conjunction with the accompanying illustration.

BRIEF DESCRIPTION OF THE DRAWING

In the drawing like element designations refer to like parts; and:

FIG. 1 is a fragmentary perspective view showing an instrumented beam for a pressure transducer rigidly secured at one end to a fixed support, in cantilever fashion, and loaded at its opposite or free end by the diaphragm of the transducer, such beam comprising a relatively limber instrumented portion constructed according to the present invention and including substantially identical deposited film bridge arm means on its two opposite surfaces, which during beam deflection experience tensile and compressive strains, respectively;

FIG. 2 is a plan view of the two parts of the limber section of the beam, laid side-by-side and front sides up, with the bridge input and output circuits being shown diagrammatically;

FIG. 3 is an enlarged side elevational view of the limber section of the instrumented beam shown by FIG. 1, with the relative thicknesses of the various films being exaggerated somewhat for clarity of illustration;

FIG. 4 is a plan view of a sheet of beam material on which a plurality of deposited film bridge arm patterns have been formed, with a cut line being depicted by a broken line;

FIG. 5 is a view of the same type as FIG. 4, but on a larger scale, and showing the severed halves placed back-to-back; and FIG. 6 is a diagrammatical showing of a typical relationship during a deposition step of the sheet beam material (on which has previously been deposited plural films of an insulative material), a strain gage mask, and an electroconductor vapor source.

DESCRIPTION OF THE PREFERRED EMBODIMENTS

The instrumented cantilever beam 10 shown by FIG. 1 may be a part of a pressure transducer of the type disclosed in my copending application Ser. No. 567,291, filed July 22, 1966, for example.

Beam 10 is shown to be of composite form and to comprise a thin and relatively limber, instrumented, intermediate portion 12 interconnected between thicker major and minor end portions 14, 16, respectively. Beam 10 is rigidly mounted in cantilever fashion onto a portion of the transducer housing 18, such as by bolts 20 securing the minor end portion 16 to the housing 18. The opposite end of the beam 10 is mechanically linked by a rod 22 to a pressure sensing diaphragm 24.

The preferred fabrication technique of the present invention comprises first using a single vapor source to evaporatively deposit a film of a suitable insulative material, such as silicon monoxide (SiO), onto the front surface 26 of at least those portions of a thin sheet of an electroconductive beam material 28 which will ultimately become the two parts 28″ of the laminated beam section 12. In the showing of FIG. 3, the thickness of the insulative substrates 30 so formed have been exaggerated for clarity of illustration. The actual thickness thereof need be only sufficient to provide good electrical insulation, e.g. about 80–100 micro inches.

The insulative substrates 30 are necessary to insulate the ensuing film strain gages from the base material 28 when the latter is metallic or otherwise electroconductive. However, it is to be understood that the beam material 28 can of itself be insulative in nature, in which case the insulative substrates 30 are not needed and can be omitted. In the preferred form of the invention the beam material 28 is a suitable relatively high tensile strength metal, such as polished stainless steel, and an insulative substrate 30 is employed.

Subsequent to the bonding of the insulative substrates 30 to the front surface 26 of beam material 28, the bridge arms A1, A2, A3, A4 are formed in the desired number on the substrates 30. Each bridge arm A1, A2, A3, A4 comprises a continuous, unbroken film or sheet of a suitable electroconductive material, such as a chromium-silicon alloy, which has been formed in bonded relation to and well within the edges of a film of the insulative substrate 30. In FIG. 3, the thickness of the arms A1, A2 has been exaggerated for clarity of illustration. In actual practice the film arms A1, A2, A3, A4 can be exceedingly thin and should be sufficiently thin to provide a substantial resistance to current flow between the input terminals (e.g. 1000 ohms). When using the alloy Cr (60%), Si (40%) as the electroconductive material, for example, the film thereof is suitably about 200–500 angstroms thick. In configuration, each film arm A is in general a rectangle with a continuous uninterrupted surface edge-to-edge, with the two opposed sides being substantially parallel to each other.

The film type strain gages A1, A2, A3, A4 are formed by the techniques known as vacuum depositions, generally known per se.

A discussion of the of the formation of strain gages by vacuum deposition can be found in the article "Thin-Film Strain-Gage Transducers," by Peter R. Periro, published in the December 1965 issue of Instruments and Control Systems. This article is hereby incorporated herein by reference.

According to the fabrication technique of the present invention, the sheet of beam material 28 (or plural identical sheets) is placed in a conventional vacuum chamber (not shown). The vacuum chamber equipment includes masking means for the insulative substrate films, masking means for the bridge arm films, an insulative vapor source, and an electroconductive vapor source. The masks are arranged in closely spaced relation to the portions of the surface 26 onto which the various film deposits are to be formed, and the respective vapor sources are shielded from the surface 26 by the respective masks except at apertures in the masks by which the film areas are formed.

With a sheet of beam material 28 in place within the vacuum chamber, and with the vacuum chamber operating at a suitable minus pressure (e.g. at a pressure of about $10^{-7}$ millimeter), the masking means for forming the insulative substrate films 30 is brought into a position over the material 28. The insulation vapor source is activated so that it generates vapor of a suitable insulation material, such as silicon monoxide (SiO), resulting in the deposition of an insulative substrate 30 on the surface 26 of beam material 28 at each location of an aperture.

By way of typical and therefore nonlimitive example, the sheet of beam material 28 depicted by FIG. 4 is shown to have had eight insulative substrate films 30 deposited on it. In other words, it was prepared for providing the requisite number of parts for completing four instrumented beam portions 12.

Following deactivation of the insulation vapor source, the insulative substrate film masking means is replaced by the bridge arm film masking means M (FIG. 6), and the bridge arm apertures A0 thereof are correctly aligned with the insulative substrate deposits 30. The electroconductive vapor source VS is then actuated, resulting in the formation on each insulative substrate 30 of a bridge arm pattern, shown in the illustrated preferred embodiment of the invention to consist of two arms per insulative substrate 30.

It is to be noted at this point that according to the technique of this invention each bridge arm means is formed simultaneously with the bridge arm means with which it will be related in a back-to-back manner upon completion of the instrumented beam portion of which they both will be a part. A single vapor source VS is used, and during deposition the receptive substrates 30 for the ultimately paired bridge arm means lie in the same plane, are spaced essentially the same distance from the vapor source, and are exposed to the same vacuum and vapor conditions. This identity of deposition conditions results in all the gages or bridge arms which will eventually work together, but on opposite sides of the beam portion 12, having substantially the same physical characteristics, and consequently substantially the same strain and temperature change response characteristics.

The bridge arms A1, A2, A3, A4 may be provided with deposited film terminal portions T of a more electroconductive material, such as chromium (Cr). The terminal portions T are also formed together in a single deposition step.

Following completion of the deposition process, the sheet 28 is cut approximately along the line X and the two halves 28″ are related back-to-back with precise registration of the bridge arm patterns so that each individual arm is substantially exactly opposite another identical arm on the opposite side of the sandwich. While precise registration is maintained, the two halves are bonded together, preferably by vacuum brazing of the two pieces of beam material 28. In FIG. 3 the bonding material has been exaggerated in thickness, and is designated 32. Next, the sandwich is cut into individual beam portions (substantially along the cut lines depicted in FIG. 5), each having two bridge arms on each of its two opposite sides.

Each beam portion 12 is interconnected between the end portions 14, 16 of a completed beam 14, such as by electron beam welding, brazing, spot welding, or otherwise securing the parts 12, 14, 16 together.

In the illustrated embodiment of the invention, the upper pair of bridge arms experience compressive strain and the lower pair of arms experience tensile strain when the free end of beam 10 is raised above the fixed end thereof by a pressure produced force transmitted from the diaphragm 24 through the connecting rod 22 to the free end of beam 10. When the free end of the beam 10 is pulled downwardly below the fixed end thereof the character of the strain experienced by the upper and lower pairs of strain gages is reversed.

As diagrammatically shown in FIG. 2, the four strain gages are electrically interconnected so as to form a Wheatstone bridge circuit in which strain induced resistance changes in all four arms contribute additively to the electrical output. In this respect, adjacent ends of arms A1, A2, which are paired opposite to each other on opposite sides of the beam portions 12, are electrically coupled together by a conductor 34 interconnected between terminals points *t1, t2.* Arm terminals *t1, t2* are also connected by conductor means 34, 36 to one terminal 38 of a means for measuring electrical potential, depicted simply as gage G. Terminal *t3* at the opposite end of arm A1 is electrically coupled to terminal *t4* of arm A4, by a conductor means 40. Terminals *t3, t4* are also connected to one terminal of a source of electrical potential B, by conductor means 40, 42. Terminal *t5* at the second end of arm A2 is electrically coupled to terminal *t6* at one end of arm A3, by conductor means 44, and such terminals *t5, t6* are both connected to the second terminal of the source of electrical potential B, by conductor means 44, 46. The remaining two terminals *t7, t8*, located at adjacent ends of bridge arms A3, A4, respectively, are electrically coupled together by conductor means 48, and to the second terminal 50 of the electrical potential measuring means G, by conductor means 52.

Although the laminated self-flexure sensing element 12 has been shown and described in the form of a limber portion of a composite type cantilever beam, it will be readily recognized that a laminated structure of this type can compose the entire beam. Also, the insulative substrate may be a single deposit over the entire front surface 26 of the beam material 28, rather than to selected definite areas thereof. The bridge arms may be formed by a vacuum deposition of a film of electroconductive material followed by an etching of the film to the desired shape. In some installations the bridge arm means on each side of the beam or element may comprise only a single arm.

Further modifications, variations, arrangements of instrumented beams for pressure transducers and for self-flexure sensing elements in general, will occur to those skilled in the art to which the invention is addressed, within the scope of the following claims.

What is claimed is:

1. A method of making a self-flexure sensing beam element for a measuring instrument, comprising:
   using a single vapor source to simultaneously deposit plural, substantially identical films of a strain sensitive electroconductive material onto insulative front surface areas of two separate or separable uniplanar parts of a beam element material, to form two substantially identical bridge arm means;
   relating such two beam element parts together, back-to-back, with registration of the bridge arms means on each part with the bridge arms means on the other part; and
   bonding such two parts together while maintaining such registration of the bridge arm means.

2. A method according to claim 1, wherein each bridge arm means comprises a pair of substantially identical bridge arms.

3. A method according to claim 1, wherein at least the back portion of each beam element part is metallic, and comprising bonding the two parts together by vacuum brazing.

4. A method of making a self-flexure sensing beam element for a measuring instrument, comprising:
   using a single vapor source to simultaneously deposit plural substantially identical films of a strain sensitive electroconductive material onto insulative front surface areas of two separate or separable parts of beam element material, to form two substantially identical pairs of substantially identical bridge arms;
   depositing a film of another and more conductive electroconductive material at each end of each bridge arm, and over the bridge arm end portions;
   relating such two beam element parts together, back-to-back, with registration of the pair of bridge arms on each part with the pair of bridge arms on the other part, to form a four arm set;
   bonding such two parts together while maintaining such registration of the bridge arm pairs; and
   trimming the assembly of bonded parts to form a single beam element having a single four arm set of substantially identical deposited bridge arms, consisting of a pair of such arms on each of two opposite surfaces of the beam element, with each pair of bridge arms being in register with the other pair.

5. A method of making a self-flexure sensing beam element for a measuring instrument, comprising:
   bonding a thin film of insulative material onto at least two separate or separable parts of an electroconductive beam element material;
   in a single operation, depositing plural substantially identical films of a strain sensitive electroconductive material onto said insulative material, to form a bridge arm means on each of said parts;
   relating such two parts together, with the bridge arm carrying insulative surfaces outwardly, with the opposite surfaces inwardly and in surface-to-surface contact, and with registration of the pair of bridge arms on each part with the pair of bridge arms on the other part;
   bonding such two parts together while maintaining such registration of the bridge arm pairs; and
   trimming the assembly of bonded parts to form a single beam element having a single four arm set of substantially identical deposited bridge arms, consisting of a pair of such arms on each of two opposite surfaces of the beam element, with each pair of bridge arms being in register with the other pair.

6. The method of claim 5, comprising bonding the two electroconductive parts together by vacuum brazing.

7. A method of making a self-flexure sensing beam element for a measuring instrument, comprising:
   in a single operation, depositing plural substantially identical films of a strain sensitive electroconductive material onto an insulative front surface of a base member, to form at least two substantially identical pairs of substantially identical bridge arms on such surface;
   dividing such base member into plural parts, each of which includes at least one pair of said bridge arms;
   relating two of such parts together, back-to-back, with registration of each pair of bridge arms on each part with another pair of bridge arms on the other part, to form at least one four arm set;
   bonding such two parts together while maintaining such registration of the bridge arms; and
   trimming the assembly of bonded parts to form at least one single beam element having a single four arm set of substantially identical deposited bridge arms, consisting of two arms on each of two opposite surfaces of the beam element.

8. A method of making and mounting a self-flexure sensing beam element for a measuring instrument, comprising:
   in a single operation, depositing plural substantially identical films of a strain sensitive electroconductive material onto insulative front surface areas of two separate or separable parts of a beam element material, to form two substantially identical pairs of substantially identical bridge arms on each surface areas;
   relating such two beam element parts together, back-to-back, with registration of the pair of bridge arms on each part with the pair of bridge arms on the other part;
   bonding such two parts together while maintaining such registration of the bridge arm pairs;
   trimming the assembly of bonded parts to form a single beam element having a single four arm set of substantially identical deposited bridge arms, consisting of a pair of such arms on each of two opposite surfaces of the beam element, with each pair being in register with the other pair;
   rigidly securing one end of said beam element to a support member; and coupling the opposite end of beam element to a movable operator element of the measuring instrument which is arranged to either bend or relax bending of the beam element by its movement.

9. The method of claim 8, further comprising electrically coupling a first end of the bridge arms on a first side of the beam element with a first end of a first of said bridge arms or the second and opposite side of said beam element, electrically coupling both of such ends to one terminal of a source of electrical potential; electrically coupling the second end of said first bridge arm on said first side of the beam element with a first end of the second bridge arm on the second side of said beam element; electrically coupling both of such latter ends to a terminal of a means for measuring electrical potential; electrically coupling a first end of the second bridge arm on the first side of said beam element with the second end of the first bridge arm on the second side of said beam element; electrically coupling both of such latter end to the second terminal of said means for measuring electrical potential; electrically coupling the second end of the second bridge arm on the first side of said beam element with the second end of the second bridge arm on the second side of said beam element; and electrically coupling both of such latter two ends to the second terminal of said source of electrical potential, to complete a four arm bridge circuit.

10. A method of making a plurality of self-flexure sensing beam elements for measuring instruments, comprising:

in a single operation, depositing plural substantially identical films of a strain sensitive electroconductive material onto insulative front surface areas of separate or separable parts of a beam element material, to form a plurality of substantially identical pairs of substantially identical bridge arms;

relating such beam element parts together, in pairs back-to-back, with registration of each pair of bridge arms on each part with another pair of bridge arms on the other part; and bonding such the parts together while maintaining such registration of the bridge arm pairs.

11. A method of making a plurality of self-flexure sensing beam elements for measuring instruments, comprising:

in a single operation, depositing plural substantially identical films of a strain sensitive electroconductive material onto insulative front surface areas of two separate or separable parts of a beam element material, to form a plurality of substantially identical pairs of substantially identical bridge arms;

relating such two beam element parts together, back-to-back with registration of each pair of bridge arms on each part with another pair of bridge arms on the other part;

bonding such two parts together while maintaining such registration of the bridge arm pairs; and trimming the assembly of bonded parts to form plural beam elements, each having a single four arm set of substantially identical deposited bridge arms, each set consisting of a pair of such arms on each of two opposite surfaces of the beam element, with each pair of bridge arms being in register with the other pair.

12. The method of claim 10, wherein the back portions of the beam element parts are metallic, and comprising bonding the two electroconductive parts together by vacuum brazing.

References Cited

UNITED STATES PATENTS

| | | | |
|---|---|---|---|
| 3,061,476 | 10/1962 | Miserocchi | 29—620 X |
| 3,197,335 | 7/1965 | Leszynski | 29—620 X |
| 3,293,585 | 12/1966 | Horn | 338—6 |

JOHN F. CAMPBELL, Primary Examiner

J. L. CLINE, Assistant Examiner

U.S. Cl. X.R.

338—6